US006772711B2

(12) United States Patent
Morgan

(10) Patent No.: US 6,772,711 B2
(45) Date of Patent: Aug. 10, 2004

(54) REVERSIBLE REFLECTIVE/FLUORESCENT SLEEVE

(76) Inventor: Jacqueline Levesque Morgan, 5010 Ocean Ave., Everett, WA (US) 98203

( * ) Notice: Subject to any disclaimer, the term of this patent is extended or adjusted under 35 U.S.C. 154(b) by 68 days.

(21) Appl. No.: 10/352,643

(22) Filed: Jan. 28, 2003

(65) Prior Publication Data

US 2003/0145802 A1 Aug. 7, 2003

Related U.S. Application Data

(60) Provisional application No. 60/354,186, filed on Feb. 4, 2002.

(51) Int. Cl.[7] .............................................. A01K 27/00
(52) U.S. Cl. ..................................................... 119/795
(58) Field of Search ................................ 119/793, 795, 119/797, 792, 858; 359/516, 517, 519

(56) References Cited

U.S. PATENT DOCUMENTS

| 3,994,560 A | * | 11/1976 | Rice ........................... 359/516 |
| 5,718,192 A | * | 2/1998 | Sebastian ..................... 119/795 |
| 6,450,129 B1 | * | 9/2002 | Flynn .......................... 119/770 |

FOREIGN PATENT DOCUMENTS

| GB | 2153646 A | * | 8/1985 | .......... A01K/27/00 |
| GB | 2160405 A | * | 12/1985 | .......... A01K/27/00 |

* cited by examiner

Primary Examiner—Robert P. Swiatek
Assistant Examiner—Bethany L Griles

(57) ABSTRACT

A reversible reflective safety device in the form of a sleeve which is rectangular in shape and which possesses two strips of highly reflective material on one side with one half of a hook and loop fastening means and two strips of high-visibility fluorescent material on the opposite side with the remaining half of the hook and loop fastening device. The resulting device is easily transformed from a daylight fluorescent safety sleeve into a nighttime reflective safety sleeve. It allows for quick and easy attachment to an implement such as a dog leash, backpack strap, umbrella handle, baby stroller, animal collar, raincoat belt, purse strap, bicycle seat post or handlebars, or countless other applications needing illumination in situations involving low light or darkness. The sleeve's design allows maximum visibility from many angles and provides a large light reflective area dynamically presented on a moving leash or other implement.

9 Claims, 3 Drawing Sheets

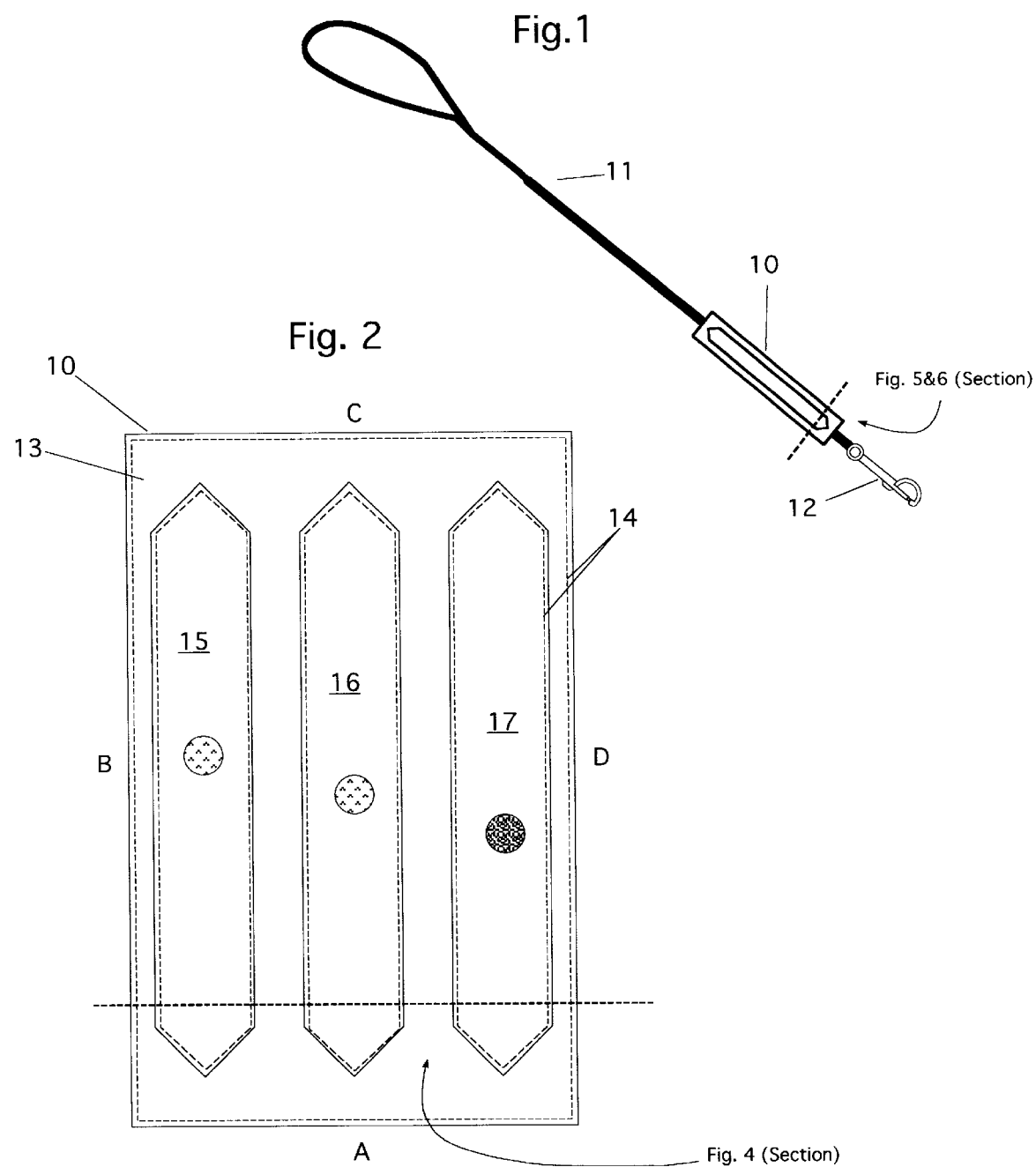

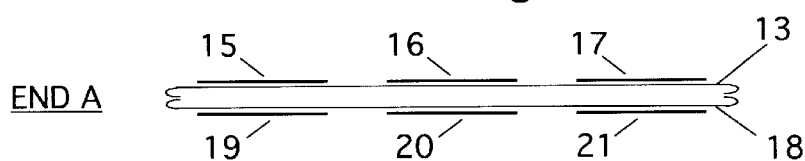
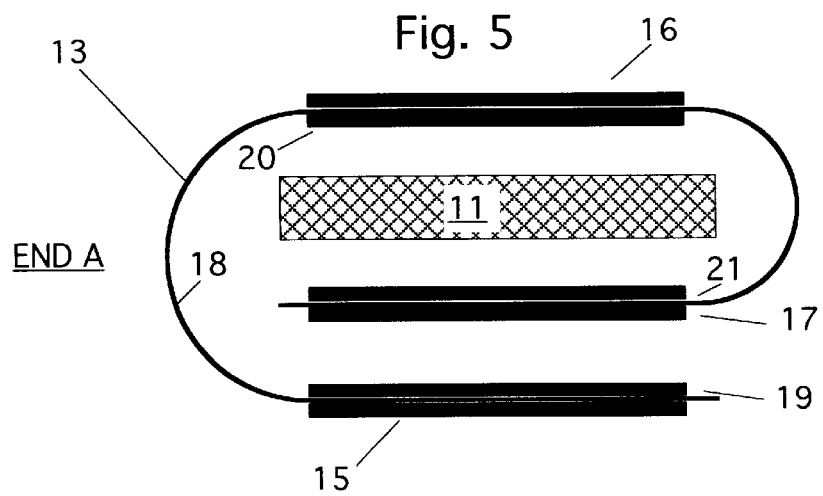
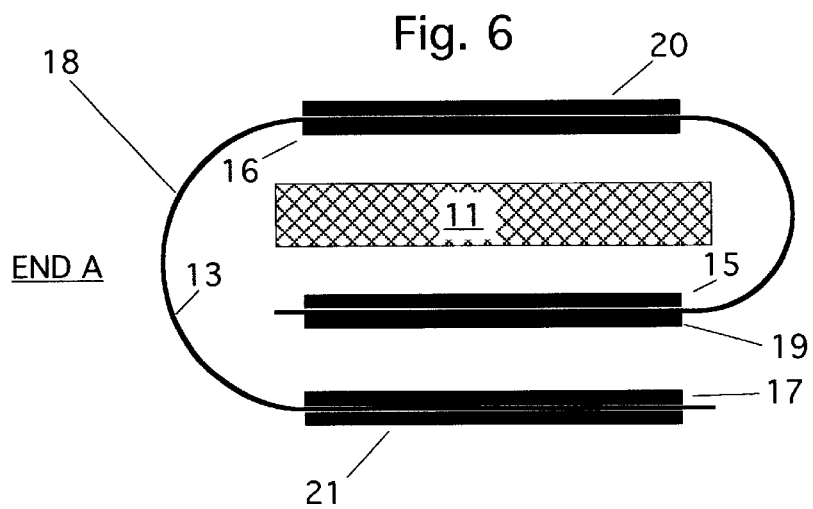

REVERSIBLE REFLECTIVE/FLUORESCENT SLEEVE

This application claims benefit of the Provisional Patent Application (No. 60/354,186) filed on Feb. 4, 2002.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention relates to a reflective accessory, hereinafter referred to as a "sleeve". The sleeve will provide a degree of visibility, which is not otherwise present for individuals and their pets. In a study by the National Highway Transportation Safety Administration, 4,739 pedestrians died and 78,000 were injured in traffic crashes in the year 2000. Most occurred in urban areas (71%), at non-intersection locations (78%), in normal weather conditions (91%) and at night (64%).

A plethora of patents exist in the field of reflective safety apparel, accessories and devices for use in recreational activities such as walking, running and cycling in low-visibility or dark conditions. Many inventions provide limited visibility for oncoming motorists. Most devices currently available do not allow for visibility of front and back of the pedestrian. Some mandate the purchase of costly accessories or replacement of items such as jackets or shoes. Many are not practical to affix, are not water/weather proof and are inconvenient to store.

SUMMARY OF THE INVENTION

The present invention employs the same retroreflection technology and satisfies the aforementioned needs in addition to heretofore unaddressed needs. Following are attributes of the reversible safety sleeve, which are unique to the field of conspicuity-enhancement techniques for pedestrians and pets.

It is an object of the present invention to provide a reversible safety sleeve having the capability of being transformed from a daylight fluorescent safety sleeve into a nighttime reflective safety sleeve in seconds.

Another object of the present invention is to provide a reversible safety sleeve that is waterproof, washable and lightweight.

Another object of the present invention is to provide a reversible safety sleeve that is durable and sturdy, allowing for long-term attachment to an implement such as a dog leash, backpack strap, umbrella handle, animal collar, livestock halter, waistband, raincoat belt, baby stroller, bicycle seat post or handlebars, or countless other applications needing illumination in situations involving low light or darkness.

Still another object of the present invention is to provide a reversible safety sleeve which is inexpensively produced, rendering it available to consumers who heretofore have been unable to purchase reflective or safety items due to prohibitive cost.

Yet another object of the present invention is to provide a reversible safety sleeve designed to allow maximum visibility from many angles elevating the level of safety and peace of mind for the individual using it.

Another object of the present invention is to provide a reversible safety sleeve that is attractive without sacrificing functionality. Fashion-conscious consumers can color-coordinate to any outfit.

Another object of the present invention is to provide a reversible safety sleeve that can be dependably secured, yet quickly and easily removed for storage or use elsewhere.

Still another object of the present invention is to provide a reversible safety sleeve which is constructed using a [preferably] lightweight material which allows the sleeve to be conveniently stored in a pocket, pouch or space a fraction of the sleeve's size in its open position.

These and other features and advantages of the present invention will become apparent upon reading the following detailed description of the preferred exemplified embodiment of the invention and upon reference to the accompanying drawings therein.

BRIEF DESCRIPTION OF THE DRAWINGS

FIG. 1 is an isometric view of the reflective sleeve as affixed to the base of a dog leash.

FIG. 2 is a top view of the light reflective sleeve in an open position.

FIG. 4 is a section view of End A with the sleeve in an open position.

FIG. 5 is a section view of End A with the sleeve in the reflective position attached to a dog leash.

FIG. 6 is a section view of End A with the sleeve in the fluorescent position attached to a dog leash.

DETAILED DESCRIPTION OF THE INVENTION

Figure 3:
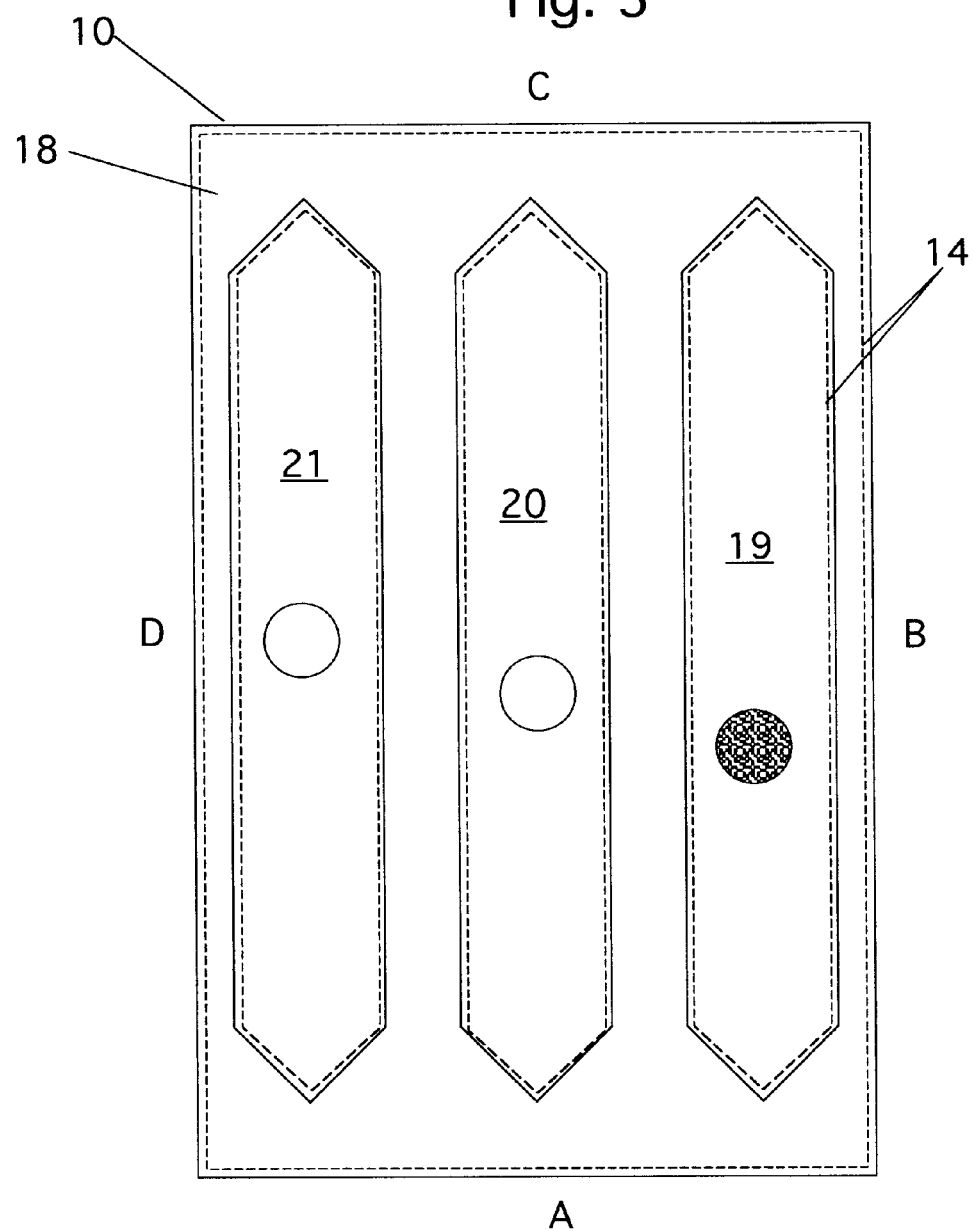
FIG. 3 is a top view of the fluorescent reflective sleeve in an open position.

FIG. 1 depicts the present reversible sleeve 10 secured to the base of a dog leash 11 at the point closest to the leash clip 12.

In accordance with one of the features of the present invention as shown in FIG. 2 in its unfolded, flat condition, there is provided a rectangular base member 13. The flexible base member is preferably formed of strong, lightweight, waterproof fabric material such as that known as Rip-Stop nylon, manufactured in a wide variety of colors. A strip of light-reflective material 15 is sewn 14 vertically onto 13 allowing for stitching 14 around the perimeter of the rectangular sleeve 10. The reflective strip material is preferably a light-reflective material known as SCOTCHLITE™ #8910 silver, manufactured by the 3M Company. According to the Technical Data Sheet Specifications, this product has a light reflectivity or brightness rating on the order of 500 candlepower lumens (CPL). Adjacent and parallel to reflective strip 15 is sewn an identical reflective strip 16. Adjacent and parallel to reflective strip 16 is sewn a strip consisting of one half of a hook and loop fastening device such as Velcro® 17.

FIG. 3 illustrates a second flexible base member 18 identical in shape, size and material to 13. Allowing for stitching around the perimeter of the sleeve 10, the remaining half of the hook-and-loop fastening device 19 is sewn vertically onto the nylon base 18. Adjacent and parallel to 19, a strip of fluorescent reflective material 20 is sewn. Adjacent and parallel to 20, an identical strip of fluorescent reflective material 21 is sewn. The fluorescent reflective material is preferably the fabric material such as that know as SCOTCHLITE™ Reflective Material #8986 red-orange or #8987 lime-yellow manufactured by the 3M Company.

FIG. 4 denotes a view from End A of Panel 13 of FIG. 2 and Panel 18 of FIG. 3 stitched together and in an open and flat position. The light reflective silver strips 15 and 16, and one half of the hook-and-loop fastener 17 are on one side 13 and the fluorescent reflective strips 20 and 21 and the remaining half of the hook-and-loop fastener 19 are one the opposite side 18.

FIG. 5 is a view from End A of the sleeve 10 in the reflective position affixed to the implement, in this case a dog leash 11. By placing the center strip 20 on top of the leash, with the leash running the length of the strip, then folding the strip 17 under, then folding the strip 15 under from the opposite side of the center strip 20, the hook-and-loop pieces 17 and 19 are joined, thus securing the sleeve to the implement.

FIG. 6 is a view from End A of the sleeve 10 in the fluorescent position affixed to the implement, a dog leash 11. By placing the center strip 16 on top of the leash with the leash running the length of the strip, then folding the strip 19 under, then folding the strip 21 under from the opposite side of the center strip 16, the hook-and-loop pieces 17 and 19 are joined, thus securing the sleeve to the implement.

In general, the present invention contemplates a device in the form of a highly light reflective sleeve on one side, and a highly visible fluorescent sleeve on the other. The resulting sleeve provides a large light reflective area dynamically presented on the moving leash or other implement.

It is thought that the present invention and its advantages will be understood from the foregoing description and it will be apparent to those skilled in the art that various changes may be made thereto without departing from the spirit and scope of the invention or sacrificing all of its material advantages, the form hereinbefore described being merely an exemplary embodiment thereof.

What is claimed is:

1. A reversible reflective safety sleeve comprising:
    a flexible rectangular base member having one highly light-reflective side for night visibility and one high-visibility fluorescent side for daytime and low-visibility conditions, each side carrying one half of a fastening means disposed at outer edges such that:
    a) by placing the item needing illumination on the center of the rectangular base, said base being positioned vertically and with the reflective side pointing away from said item, the left third is folded inward and onto item, exposing one half of a hook and loop fastener, and the right third folded inward and secured directly on top of the left third with the remaining half of a hook and loop fastener resulting in a reflective sleeve visible from all angles at night and;
    b) by placing the item needing illumination on the center of the rectangular base, said base being positioned vertically and with the fluorescent side pointing away from said item, the right third is folded inward and onto item, exposing one half of a hook and loop fastener, and the left third folded inward and secured directly on top of the right third with the remaining half of a hook and loop fastener resulting in a fluorescent sleeve visible from all angles in daylight and low-visibility conditions.

2. A reversible reflective safety sleeve as claimed in claim 1 wherein the base member includes two identical rectangular pieces of flexible, lightweight, waterproof material.

3. A reversible reflective safety sleeve as claimed in claim 1 wherein said base member further includes:
    a) two strips of light reflective material are sewn on one piece of material comprising half of the base member and
    b) one half of the fastening means is sewn onto same base member, all in vertical fashion, parallel to one another and in said order.

4. A safety sleeve of claim 1 wherein said base member further includes:
    a) the second half of the fastening means is sewn onto the second piece of rectangular material comprising the base member and
    b) two strips of fluorescent material are sewn onto same base member, all in vertical fashion, parallel to one another and in said order.

5. A safety sleeve of claim 1 wherein the reflective material has a brightness rating on the order of 500 candle power lumens.

6. A safety sleeve of claim 1 wherein the fluorescent material has a brightness rating on the order of 175 candle power lumens.

7. A safety sleeve of claim 1 wherein said fastening means includes hook and loop fasteners.

8. A safety sleeve of claim 1 wherein both pieces comprising base member are sewn together around the perimeter with the reflective and fluorescent sides turned outward resulting in the two reflective strips and one half of the fastening means on one side and the other half of the fastening means and the two fluorescent strips being directly on the other side, in said order.

9. A reversible safety sleeve of claim 1 wherein:
    a) folding the base member into thirds in one direction results in a reflective device and;
    b) folding the base member into thirds in the opposite direction results in a fluorescent device, both having the ability to be secured to a myriad of implements needing illumination in situations involving low light or darkness.

* * * * *